United States Patent
Schultz et al.

(10) Patent No.: US 10,641,070 B2
(45) Date of Patent: *May 5, 2020

(54) FLOW CONTROL IN SUBTERRANEAN WELLS

(71) Applicant: THRU TUBING SOLUTIONS, INC., Oklahoma City, OK (US)

(72) Inventors: Roger L. Schultz, Newcastle, OK (US); Brock W. Watson, Sadler, TX (US); Andrew M. Ferguson, Moore, OK (US); Gary P. Funkhouser, Roman Forest, TX (US)

(73) Assignee: THRU TUBING SOLUTIONS, INC., Oklahoma City, OK (US)

( * ) Notice: Subject to any disclaimer, the term of this patent is extended or adjusted under 35 U.S.C. 154(b) by 640 days.

This patent is subject to a terminal disclaimer.

(21) Appl. No.: 15/347,535

(22) Filed: Nov. 9, 2016

(65) Prior Publication Data

US 2017/0058650 A1     Mar. 2, 2017

Related U.S. Application Data

(60) Division of application No. 15/062,669, filed on Mar. 7, 2016, now Pat. No. 9,523,267, which is a
(Continued)

(51) Int. Cl.
*E21B 43/12*      (2006.01)
*E21B 33/138*     (2006.01)
(Continued)

(52) U.S. Cl.
CPC .............. *E21B 43/12* (2013.01); *E21B 17/20* (2013.01); *E21B 33/13* (2013.01); *E21B 33/138* (2013.01);
(Continued)

(58) Field of Classification Search
CPC .............................. E21B 33/13; E21B 33/134
(Continued)

(56) References Cited

U.S. PATENT DOCUMENTS

| | | |
|---|---|---|
| 2,109,058 A | 2/1938 | Blee |
| 2,157,493 A | 5/1939 | Miller et al. |

(Continued)

FOREIGN PATENT DOCUMENTS

| | | |
|---|---|---|
| WO | 91-11587 A1 | 8/1991 |
| WO | 2007066254 A2 | 7/2007 |

(Continued)

OTHER PUBLICATIONS

"Rope." Merriam-Webster.com. Merriam-Webster, n.d. Web. Jan. 4, 2017.*

(Continued)

*Primary Examiner* — Angela M DiTrani Leff
(74) *Attorney, Agent, or Firm* — Smith IP Services, P.C.

(57) ABSTRACT

A method of controlling flow in a well can include a device introduced into the well being conveyed by flow in the well, and the device having a plurality of fibers extending outwardly from a body, the fibers being retained by a retainer. A well system can include a flow conveyed device conveyed through a tubular string by flow in the tubular string, and the flow conveyed device including a body with a plurality of fibers extending outwardly from the body. A retainer can at least partially enclose the device. A flow conveyed device for use in a well can include a body, and a plurality of fibers joined to the body, each of the fibers having a lateral dimension that is substantially smaller than a size of the body.

9 Claims, 12 Drawing Sheets

Related U.S. Application Data continuation-in-part of application No. 14/698,578, filed on Apr. 28, 2015.

(51) Int. Cl.

| | |
|---|---|
| *E21B 43/26* | (2006.01) |
| *E21B 17/20* | (2006.01) |
| *E21B 33/13* | (2006.01) |
| *E21B 43/11* | (2006.01) |
| *E21B 43/14* | (2006.01) |
| *E21B 34/00* | (2006.01) |

(52) U.S. Cl.
CPC ............ *E21B 43/26* (2013.01); *E21B 43/261* (2013.01); *C09K 2208/08* (2013.01); *E21B 43/11* (2013.01); *E21B 43/14* (2013.01); *E21B 2034/007* (2013.01)

(58) Field of Classification Search
USPC ........................................ 166/192, 193, 284
See application file for complete search history.

(56) References Cited

U.S. PATENT DOCUMENTS

| | | | |
|---|---|---|---|
| 2,370,833 A | 3/1945 | Baker | |
| 2,621,351 A | 12/1952 | Piety | |
| 2,754,910 A | 7/1956 | Derrick et al. | |
| 2,768,693 A | 10/1956 | Hughes, Jr. | |
| 2,788,072 A | 4/1957 | Goodwin | |
| 2,838,117 A | 6/1958 | Clark, Jr. et al. | |
| 2,933,136 A | 4/1960 | Ayers et al. | |
| 2,970,645 A | 2/1961 | Glass | |
| 2,988,136 A | 6/1961 | Kowalczyk | |
| 3,011,548 A | 12/1961 | Holt | |
| 3,028,914 A | 4/1962 | Flickinger | |
| 3,086,587 A | 4/1963 | Zandmer et al. | |
| 3,119,600 A | 1/1964 | Bitter | |
| 3,170,517 A | 2/1965 | Graham et al. | |
| 3,174,546 A | 3/1965 | Flickinger | |
| 3,251,993 A | 5/1966 | Bader et al. | |
| 3,292,700 A | 12/1966 | Berry | |
| 3,376,934 A | 4/1968 | Willman et al. | |
| 3,399,726 A | 9/1968 | Harris et al. | |
| 3,417,821 A | 12/1968 | Tinsley et al. | |
| 3,434,539 A | 3/1969 | Merritt | |
| 3,437,147 A * | 4/1969 | Davies ................. | C09K 8/72 166/193 |
| 3,595,314 A | 7/1971 | Garner | |
| 3,707,194 A | 12/1972 | Svaldi | |
| 3,814,187 A | 6/1974 | Holamn | |
| 3,895,678 A | 7/1975 | Wright et al. | |
| 4,167,139 A | 9/1979 | Gleason et al. | |
| 4,187,909 A | 2/1980 | Erbstoesser | |
| 4,194,561 A | 3/1980 | Stokley et al. | |
| 4,244,425 A | 1/1981 | Erbstoesser | |
| 4,407,368 A | 10/1983 | Erbstoesser | |
| 4,505,334 A | 3/1985 | Doner et al. | |
| 4,628,994 A | 12/1986 | Towner et al. | |
| 4,716,964 A | 1/1988 | Erbstoesser et al. | |
| 4,921,577 A | 5/1990 | Eubank | |
| 4,924,811 A | 5/1990 | Axelrod | |
| 5,004,048 A | 4/1991 | Bode | |
| 5,052,220 A | 10/1991 | Piers | |
| 5,052,489 A | 10/1991 | Carisella et al. | |
| 5,253,709 A | 10/1993 | Kendrick et al. | |
| 5,456,317 A | 10/1995 | Hood | |
| 5,507,345 A | 4/1996 | Wehunt, Jr. et al. | |
| 5,908,073 A | 6/1999 | Nguyen et al. | |
| 6,070,666 A | 6/2000 | Montgomery | |
| 6,394,184 B2 | 5/2002 | Tolman et al. | |
| 6,427,776 B1 | 8/2002 | Hoffman et al. | |
| 6,543,538 B2 | 4/2003 | Tolman et al. | |
| 6,655,475 B1 | 12/2003 | Wald | |
| 6,973,966 B2 | 12/2005 | Szarka | |
| 7,225,869 B2 | 6/2007 | Willet et al. | |
| 7,273,099 B2 | 9/2007 | East, Jr. et al. | |
| 7,364,051 B2 | 4/2008 | Daiz et al. | |
| 7,451,823 B2 | 11/2008 | Wilson | |
| 7,527,095 B2 | 5/2009 | Bloess et al. | |
| 7,559,363 B2 | 7/2009 | Howell et al. | |
| 7,565,929 B2 | 7/2009 | Bustos et al. | |
| 7,571,773 B1 | 8/2009 | West et al. | |
| 7,624,810 B2 | 12/2009 | Fould et al. | |
| 7,673,673 B2 | 3/2010 | Surjaatmadja et al. | |
| 7,673,688 B1 | 3/2010 | Jones et al. | |
| 7,748,452 B2 | 7/2010 | Sullivan et al. | |
| 7,810,567 B2 | 10/2010 | Daniels et al. | |
| 7,874,365 B2 | 1/2011 | East, Jr. et al. | |
| 7,891,424 B2 | 2/2011 | Creel et al. | |
| 8,088,717 B2 | 1/2012 | Polizzotti et al. | |
| 8,240,392 B2 | 8/2012 | Barnard et al. | |
| 8,256,515 B2 | 9/2012 | Barbee | |
| 8,281,860 B2 | 10/2012 | Boney et al. | |
| 8,307,916 B1 | 11/2012 | Wald | |
| 8,397,820 B2 | 3/2013 | Fehr et al. | |
| 8,505,632 B2 | 8/2013 | Guerrero et al. | |
| 8,596,362 B2 | 12/2013 | Nelson | |
| 8,646,529 B2 | 2/2014 | Clark et al. | |
| 8,757,260 B2 | 6/2014 | Luo et al. | |
| 8,776,886 B2 | 7/2014 | Rondeau | |
| 8,851,172 B1 | 10/2014 | Dudzinski | |
| 8,853,137 B2 | 10/2014 | Todd et al. | |
| 8,887,803 B2 | 11/2014 | East, Jr. et al. | |
| 8,950,438 B2 | 2/2015 | Ryan | |
| 8,950,491 B2 | 2/2015 | Frost | |
| 9,187,975 B2 | 11/2015 | Rochen | |
| 9,284,798 B2 | 3/2016 | Jamison et al. | |
| 9,334,704 B2 | 5/2016 | Mineo et al. | |
| 9,523,267 B2 | 12/2016 | Schultz et al. | |
| 9,551,204 B2 | 1/2017 | Schultz et al. | |
| 9,567,824 B2 | 2/2017 | Watson et al. | |
| 9,567,825 B2 | 2/2017 | Schultz et al. | |
| 9,567,826 B2 | 2/2017 | Schultz et al. | |
| 9,708,883 B2 | 7/2017 | Schultz et al. | |
| 9,745,820 B2 | 8/2017 | Watson et al. | |
| 9,816,341 B2 | 11/2017 | Funkhouser et al. | |
| 9,920,589 B2 | 3/2018 | Watson et al. | |
| 2002/0007949 A1 | 1/2002 | Tolman et al. | |
| 2004/0129460 A1 | 7/2004 | Macquoid et al. | |
| 2004/0261990 A1 | 12/2004 | Boseman et al. | |
| 2005/0184083 A1 | 8/2005 | Diaz et al. | |
| 2005/0230117 A1 | 10/2005 | Wilkinson | |
| 2006/0102336 A1 | 5/2006 | Campbell | |
| 2006/0113077 A1 | 6/2006 | Willberg et al. | |
| 2006/0169449 A1 | 8/2006 | Mang et al. | |
| 2006/0213662 A1 | 9/2006 | Creel et al. | |
| 2007/0039739 A1 | 2/2007 | Wilson | |
| 2007/0079965 A1 | 4/2007 | Nguyen et al. | |
| 2007/0169935 A1 | 7/2007 | Akbar et al. | |
| 2007/0187099 A1 | 8/2007 | Wang | |
| 2008/0000639 A1 | 1/2008 | Clark et al. | |
| 2008/0093073 A1 | 4/2008 | Bustos et al. | |
| 2008/0128133 A1 | 6/2008 | Turley et al. | |
| 2008/0196896 A1 | 8/2008 | Bustos et al. | |
| 2008/0200352 A1 | 8/2008 | Willberg et al. | |
| 2010/0122813 A1 | 5/2010 | Trummer et al. | |
| 2010/0147866 A1 | 6/2010 | Witkowski et al. | |
| 2010/0152070 A1 | 6/2010 | Ghassemzadeh | |
| 2010/0175889 A1 | 7/2010 | Gartz et al. | |
| 2010/0200235 A1 | 8/2010 | Luo et al. | |
| 2010/0307747 A1 | 12/2010 | Shindgikar et al. | |
| 2011/0226479 A1 | 9/2011 | Tippel et al. | |
| 2011/0297396 A1 | 12/2011 | Hendel et al. | |
| 2012/0013893 A1 | 1/2012 | Maida et al. | |
| 2012/0085548 A1 | 4/2012 | Fleckenstein et al. | |
| 2012/0181032 A1* | 7/2012 | Naedler .................. | E21B 43/26 166/308.1 |
| 2012/0211219 A1 | 8/2012 | McGuire et al. | |
| 2012/0234538 A1 | 9/2012 | Martin et al. | |
| 2012/0285695 A1* | 11/2012 | Lafferty .................. | C09K 8/03 166/310 |
| 2013/0098600 A1 | 4/2013 | Roberts | |
| 2013/0186632 A1 | 7/2013 | Makowiecki et al. | |

(56) References Cited

U.S. PATENT DOCUMENTS

| | | | |
|---|---|---|---|
| 2013/0233553 A1 | 9/2013 | Bugrin et al. | |
| 2013/0292123 A1* | 11/2013 | Murphree | E21B 34/14 |
| | | | 166/308.1 |
| 2013/0341014 A1 | 12/2013 | Trummer et al. | |
| 2014/0022537 A1 | 1/2014 | Samson et al. | |
| 2014/0116712 A1 | 5/2014 | Bansal et al. | |
| 2014/0151052 A1 | 6/2014 | Themig et al. | |
| 2014/0231086 A1 | 8/2014 | Jamison et al. | |
| 2014/0274815 A1 | 9/2014 | Lovett et al. | |
| 2015/0060072 A1 | 3/2015 | Busby et al. | |
| 2015/0075793 A1 | 3/2015 | Dotson et al. | |
| 2015/0083423 A1 | 3/2015 | Brannon et al. | |
| 2015/0090453 A1 | 4/2015 | Tolman et al. | |
| 2015/0122364 A1 | 5/2015 | Cheatham, III et al. | |
| 2015/0191988 A1 | 7/2015 | Kiesel et al. | |
| 2015/0275644 A1 | 10/2015 | Chen et al. | |
| 2016/0130933 A1 | 5/2016 | Madasu | |
| 2016/0251930 A1 | 9/2016 | Jacob et al. | |
| 2016/0319628 A1 | 11/2016 | Schultz et al. | |
| 2016/0319629 A1 | 11/2016 | Schultz et al. | |
| 2016/0319630 A1 | 11/2016 | Watson et al. | |
| 2016/0319631 A1 | 11/2016 | Schultz et al. | |
| 2016/0319632 A1 | 11/2016 | Schultz et al. | |
| 2016/0319647 A1 | 11/2016 | Schultz et al. | |
| 2016/0348465 A1 | 12/2016 | Schultz et al. | |
| 2016/0348466 A1 | 12/2016 | Schultz et al. | |
| 2016/0348467 A1 | 12/2016 | Watson et al. | |
| 2017/0030169 A1 | 2/2017 | Funkhouser et al. | |
| 2017/0107784 A1 | 4/2017 | Watson et al. | |
| 2017/0107786 A1 | 4/2017 | Schultz et al. | |
| 2017/0260828 A1 | 9/2017 | Watson et al. | |
| 2017/0275961 A1 | 9/2017 | Schultz et al. | |
| 2017/0275965 A1 | 9/2017 | Watson et al. | |
| 2017/0335651 A1 | 11/2017 | Watson et al. | |
| 2018/0135394 A1 | 5/2018 | Tolman | |
| 2018/0245439 A1 | 8/2018 | Entchev et al. | |

FOREIGN PATENT DOCUMENTS

| | | | |
|---|---|---|---|
| WO | 2013184238 A1 | 12/2013 | |
| WO | 2014042552 A1 | 3/2014 | |
| WO | 2014099206 A1 | 6/2014 | |

OTHER PUBLICATIONS

"Thread." Merriam-Webster.com. Merriam-Webster, n.d. Web. Jan. 4, 2017.*
International Search Report with Written Opinion dated Jan. 26, 2016 for PCT Patent Application No. PCT/US15/038248, 16 pages.
Office Action dated Apr. 13, 2016 for U.S. Appl. No. 14/698,578, 27 pages.
Office Action dated Apr. 13, 2016 for U.S. Appl. No. 14/966,812, 27 pages.
"Fabric." Merriam-Webster.com. Merriam-Webster, n.d. Web. Apr. 5, 2016, 6 pages.
"Rope." Merriam-Webster.com. Merriam-Webster, n.d. Web. Apr. 5, 2016, 10 pages.
Specification and drawings for Patent Application No. PCT/US16/29314 filed Apr. 26, 2016, 55 pages.
Specification and drawings for Patent Application No. PCT/US16/29357 filed Apr. 26, 2016, 50 pages.
Specification and drawings for Patent Application No. PCT/US15/38248 filed Jun. 29, 2015, 39 pages.
MONOSOL; "Film Data Sheet", product information brochure, dated Mar. 6, 2012, 1 page.
Office Action dated Oct. 17, 2016 for U.S. Appl. No. 15/138,968, 32 pages.
Office Action dated Jul. 11, 2016 for U.S. Appl. No. 15/062,669, 26 pages.
Office Action dated Jul. 18, 2016 for U.S. Appl. No. 14/966,812, 22 pages.
Office Action dated Jul. 18, 2016 for U.S. Appl. No. 15/138,408, 26 pages.
Office Action dated Jul. 20, 2016 for U.S. Appl. No. 15/138,327, 29 pages.
Office Action dated Jul. 20, 2016 for U.S. Appl. No. 15/138,378, 25 pages.
Merriam Webster, "Bundle", web page, retrieved Jul. 5, 2016 from www.merriam-webster.com/dictionary/bundle, 7 pages.
Merriam-Webster, "Filament", web page, retrieved Aug. 12, 2016 from www.merriam-webster.com/dictionary/filament, 4 pages.
Merriam-Webster, "Lateral", web page, retrieved Aug. 12, 2016 from www.merriam-webster.com/dictionary/lateral, 5 pages.
Wikipedia, "Nylon 6", web page, retrieved Aug. 12, 2016 from https://en.wikipedia.org/wiki/Nylon_6, 4 pages.
Wolfram Research, "Drag Coefficient", web page, retrieved Aug. 12, 2016 from http://scienceworld.wolfram.com/physics/DragCoefficient.html, 1 page.
International Search Report with Written Opinion dated Aug. 18, 2016 for PCT Patent Application No. PCT/US2016/029314, 18 pages.
International Search Report with Written Opinion dated Aug. 17, 2016 for PCT Patent Application No. PCT/US2016/029357, 18 pages.
Specification and drawings for U.S. Appl. No. 15/296,342, filed Oct. 18, 2016, 120 pages.
Specification and drawings for PCT Patent Application No. PCT/US16/57514, filed Oct. 18, 2016, 120 pages.
Office Action dated Oct. 13, 2016 for U.S. Appl. No. 15/138,449, 35 pages.
Office Action dated Oct. 20, 2016 for U.S. Appl. No. 15/138,327, 23 pages.
Office Action dated Oct. 20, 2016 for U.S. Appl. No. 15/138,685, 35 pages.
Office Action dated Nov. 2, 2016 for U.S. Appl. No. 14/698,578, 28 pages.
Raghavendra R. Hegde, et al.; "Nylon Fibers", online article, dated Apr. 2004, 8 pages.
thefreedictionary.com; "Threaded", online dictionary definition, dated Sep. 15, 2016, 5 pages.
Office Action dated Feb. 1, 2017 for U.S. Appl. No. 15/296,342, 25 pages.
International Search Report with Written Opinion dated Feb. 1, 2017 for PCT Patent Application No. PCT/US2016/059476, 17 pages.
Office Action dated Feb. 13, 2017 for U.S. Appl. No. 15/138,685, 17 pages.
American Petroleum Institute; "Perforating", glossary of Oilfield Production Terminology, First Edition, p. 186, dated Jan. 1, 1988, 292 pages.
Office Action dated Feb. 14, 2017 for U.S. Appl. No. 15/138,449, 13 pages.
Office Action dated Feb. 15, 2017 for U.S. Appl. No. 15/138,968, 22 pages.
Office Action dated Feb. 22, 2017 for U.S. Appl. No. 15/390,941, 29 pages.
Office Action dated Feb. 24, 2017 for U.S. Appl. No. 15/390,976, 30 pages.
"Knot." Merriam-Webster.com. Merriam-Webster, n.d. Web. Feb. 16, 2017, 13 pages.
"Thread." Merriam-Webster.com. Merriam-Webster, n.d. Web. Feb. 16, 2017, 12 pages.
Office Action dated Feb. 22, 2017 for U.S. Appl. No. 15/391,014, 29 pages.
Office Action dated Apr. 13, 2017 for U.S. Appl. No. 15/162,334, 26 pages.
Interntional Search Report with Written Opinion dated Feb. 1, 2017 for PCT Patent Application No. PCT/US16/059476, 17 pages.
U.S. Office Action dated Feb. 1, 2017 for U.S. Appl. No. 15/296,342, 25 pages.
Office Action dated Aug. 16, 2017 for U.S. Appl. No. 14/698,578, 9 pages.
Office Action dated Aug. 16, 2017 for U.S. Appl. No. 15/390,976, 25 pages.

(56) References Cited

OTHER PUBLICATIONS

International Search Report with Written Opinion dated Aug. 25, 2017 for PCT Patent Application No. PCT/US2017/036090, 37 pages.
Office Action dated May 9, 2017 for U.S. Appl. No. 15/138,685, 42 pages.
Office Action dated May 12, 2017 for U.S. Appl. No. 15/296,342, 23 pages.
Office Action dated Jul. 11, 2017 for U.S. Appl. No. 15/622,016, 16 pages.
Office Action dated Jul. 13, 2017 for U.S. Appl. No. 15/615,136, 13 pages.
Office Action dated Jul. 14, 2017 for U.S. Appl. No. 15/391,014, 24 pages.
Office Action dated Jul. 17, 2017 for U.S. Appl. No. 15/138,685, 21 pages.
Office Action dated Jul. 20, 2017 for U.S. Appl. No. 15/162,334, 18 pages.
"Yarn"; Definition of Yarn by Merriam-Webster.com, Merrian-Webster, n.d. Web., Aug. 11, 2017, 6 pages.
Office Action dated Jul. 18, 2017 for U.S. Appl. No. 15/390,941, 27 pages.
Office Action dated Jul. 3, 2019 for U.S. Appl. No. 15/726,160, 17 pages.
GCC Examination Report dated Jun. 17, 2019 for GCC Patent Application No. 2016-36182, 3 pages.
Canadian Office Action dated Aug. 2, 2019 for CA Patent Application No. 3,019,772, 5 pages.
Australian Examination Report dated Jul. 11, 2018 for AU Patent Application No. 53026THR/MRR, 3 pages.
GCC Examination Report dated Jul. 18, 2018 for GCC Patent Application No. GC 2016-31224, 4 pages.
GCC Examination Report dated Jul. 18, 2018 for GCC Patent Application No. GC 2016-31223, 4 pages.
Office Action dated Oct. 9, 2018 for U.S. Appl. No. 15/658,697, 24 pages.
Examiner's Report dated Mar. 28, 2018 for U.S. Appl. No. 15/390,976, 10 pages.
Examiner's Report dated Mar. 28, 2018 for U.S. Appl. No. 15/391,014, 14 pages.
Office Action dated Mar. 29, 2018 for U.S. Appl. No. 15/622,016, 28 pages.
Office Action dated Apr. 20, 2018 for U.S. Appl. No. 15/138,685, 27 pages.
Office Action dated Mar. 30, 2018 for U.S. Appl. No. 15/615,136, 28 pages.
Australian Examination Report dated Apr. 17, 2018 for AU Patent Application No. 2015393421, 4 pages.
GCC Examination Report dated May 28, 2018 for GCC Patent Application No. 2016-31218, 4 pages.
GCC Examination Report dated May 28, 2018 for GCC Patent Application No. 2016-31220, 4 pages.
GCC Examination Report dated May 27, 2018 for GCC Patent Application No. 2016-31217, 4 pages.
GCC Examination Report dated May 27, 2018 for GCC Patent Application No. 2016-31216, 4 pages.
International Search Report with Written Opinion dated Aug. 1, 2018 for PCT Patent Application No. PCT/US2018/029395, 20 pages.
International Search Report with Written Opinion dated Aug. 2, 2018 for PCT Patent Application No. PCT/US2018/029383, 20 pages.
GCC Examination Report dated Jun. 3, 2018 for GCC Patent Application No. 2016-31222, 4 pages.
Canadian Office Action dated Nov. 23, 2018 for CA Patent Application No. 2,995,533, 4 pages.
Australian Examination Report dated Nov. 14, 2018 for AU Patent Application No. 2017218948, 5 pages.
Australian Examination Report dated Nov. 7, 2018 for AU Patent Application No. 2017219082, 5 pages.
Canadian Office Action dated Oct. 16, 2018 for CA Patent Application No. 2,992,712, 5 pages.
Office Action dated Jun. 11, 2018 for U.S. Appl. No. 15/658,697, 52 pages.
Office Action dated Jul. 20, 2018 for U.S. Appl. No. 15/615,136, 14 pages.
Australian Examination Report dated Nov. 2, 2018 for AU Patent Application No. 2017219089, 5 pages.
Canadian Office Action dated Nov. 30, 2018 for CA Patent Application No. 2,957,681, 3 pages.
Office Action dated Dec. 13, 2018 for U.S. Appl. No. 15/390,941, 11 pages.
Australian Examination Report dated Nov. 21, 2018 for AU Patent Application No. 2017216597, 5 pages.
Office Action dated Dec. 11, 2018 for U.S. Appl. No. 15/615,136, 37 pages.
Office Action dated Jan. 14, 2019 for U.S. Appl. No. 15/609,671, 66 pages.
International Search Report with Written Opinion dated Dec. 3, 2018 for PCT Patent Application No. PCT/US2017/059644, 20 pages.
GCC Examination Report dated Dec. 24, 2018 for GCC Patent Application No. 2016-31224, 4 pages.
Australian Examination Report dated Feb. 18, 2019 for AU Patent Application No. 2017219082, 3 pages.
GCC Examination Report dated Dec. 24, 2018 for GCC Patent Application No. 2016-31223, 4 pages.
Office Action dated Jan. 29, 2019 for U.S. Appl. No. 15/622,016, 22 pages.
Australian Examination Report dated Feb. 18, 2019 for AU Patent Application No. 2017279758, 3 pages.
Office Action dated Feb. 4, 2019 for U.S. Appl. No. 15/567,779, 58 pages.
Office Action dated Feb. 11, 2019 for U.S. Appl. No. 16/214,174, 17 pages.
Office Action dated Feb. 11, 2019 for U.S. Appl. No. 16/238,838, 25 pages.
Australian Examination Report dated Feb. 26, 2019 for AU Patent Application No. 2017276220, 4 pages.
Office Action dated Mar. 18, 2019 for U.S. Appl. No. 15/658,697, 34 pages.
Office Action dated Mar. 18, 2019 for U.S. Appl. No. 15/726,160, 62 pages.
GCC Examination Report dated Dec. 23, 2018 for GCC Patent Application No. 2016-31222, 4 pages.
Perf Sealers; "History of Pertoration Ball Sealers in the Oil and Gas Industry", company website article, dated 2014-2019, 4 pages.
Office Action dated Mar. 20, 2019 for U.S. Appl. No. 15/432,041, 39 pages.
Canadian Office Action dated Dec. 13, 2017 for CA Patent Application No. 2,957,681, 3 pages.
Specification and drawings for U.S. Appl. No. 15/745,608, filed Jan. 17, 2018, 56 pages.
Specification and Drawings for U.S. Appl. No. 15/567,779, filed Oct. 19, 2017, 63 pages.
Office Action dated Nov. 3, 2017 for U.S. Appl. No. 15/138,685, 15 pages.
Office Action dated Nov. 7, 2017 for U.S. Appl. No. 15/162,334, 16 pages.
Office Action dated Nov. 13, 2017 for U.S. Appl. No. 15/622,016, 44 pages.
Office Action dated Nov. 13, 2017 for U.S. Appl. No. 15/615,136, 34 pages.
Examiner's Answer dated Nov. 15, 2017 for U.S. Appl. No. 15/347,535, 14 pages.
Examination Report dated Dec. 24, 2018 for GCC Patent Application No. 2016-31224, 4 pages.
Examination Report dated Apr. 2, 2019 for GCC Patent Application No. 2016-31243, 4 pages.
Examination Report dated Mar. 2, 2019 for GCC Patent Application No. 2016-31242, 4 pages.
Oxford Dictionaries; "body", definition of body in English, dated May 23, 2019, 7 pages.

(56) References Cited

OTHER PUBLICATIONS

Office Action dated May 29, 2019 for U.S. Appl. No. 15/567,779, 18 pages.
Office Action dated May 29, 2019 for U.S. Appl. No. 16/214,174, 26 pages.
Examination Report dated Mar. 11, 2019 for GCC Patent Application No. 2016-32206, 5 pages.
Examiner's Answer dated Jun. 3, 2019 for U.S. Appl. No. 15/615,136, 17 pages.
Examination Report dated Feb. 12, 2019 for GCC Patent Application No. 2017-33854, 5 pages.
Office Action dated Apr. 19, 2019 for U.S. Appl. No. 15/609,671, 23 pages.
Canadian Office Action dated Apr. 11, 2019 for CA Patent Application No. 2,992,712, 4 pages.
Specifications and drawings for U.S. Appl. No. 16/402,396, filed May 3, 2019, 93 pages.
Office Action dated Sep. 16, 2019 for U.S. Appl. No. 15/609,671, 39 pages.
Office Action dated Sep. 23, 2019 for U.S. Appl. No. 16/214,174, 26 pages.
Lexico Dictionaries; "Knot", definition of knot in English, Sep. 17, 2019, 8 pages.
Lexico Dictionaries; "Body", definition of body in English, dated Sep. 17, 2019, 7 pages.
Examiner's Answer dated Sep. 25, 2019 for U.S. Appl. No. 15/658,697, 26 pages.
Office Action dated Sep. 11, 2019 for U.S. Appl. No. 15/567,779, 33 pages.
Office Action dated Sep. 23, 2019 for U.S. Appl. No. 15/745,608, 69 pages.

\* cited by examiner

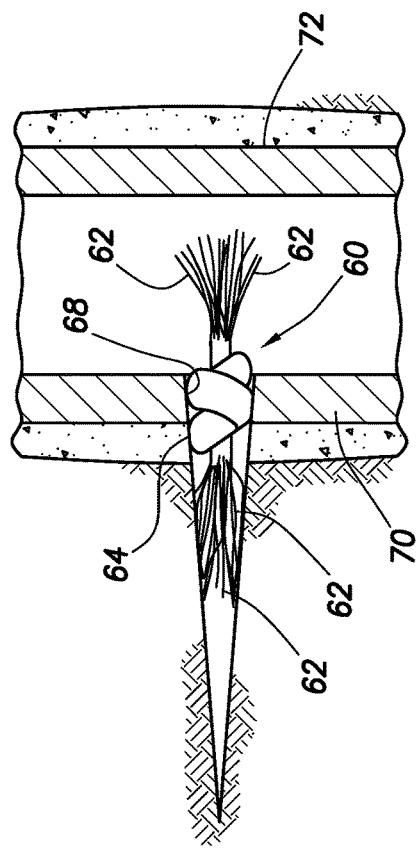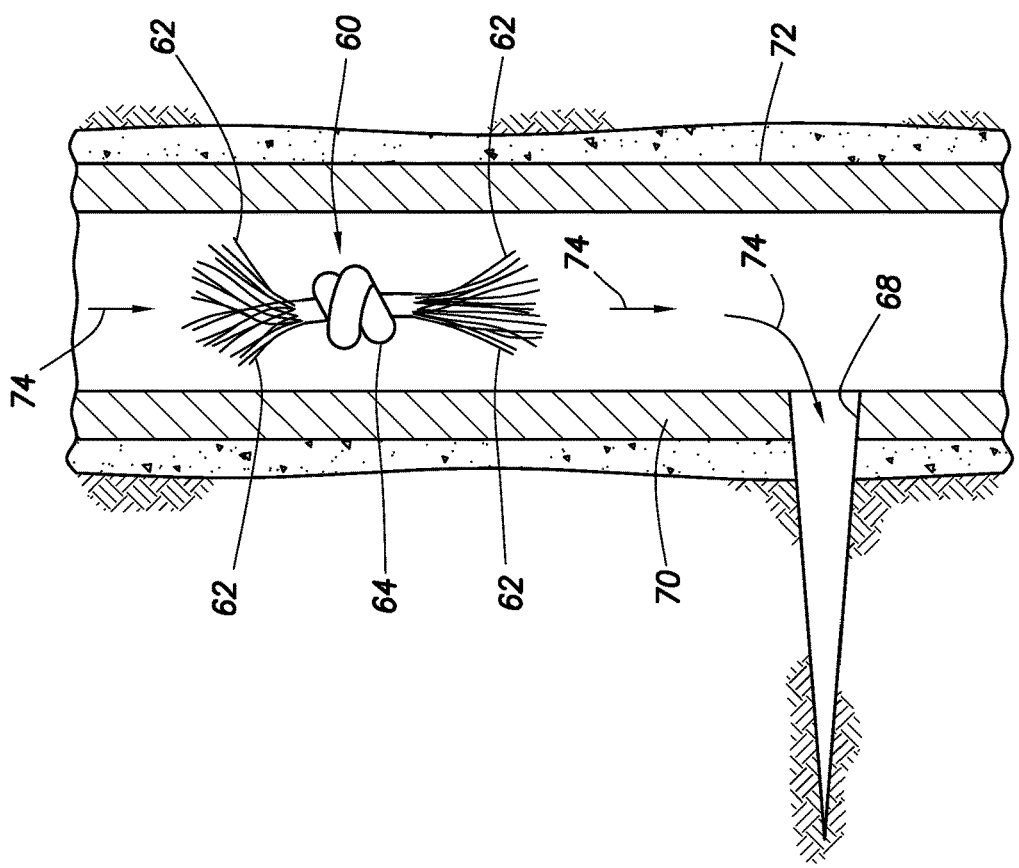

FLOW CONTROL IN SUBTERRANEAN WELLS

CROSS-REFERENCE TO RELATED APPLICATIONS

The present application is a division of U.S. application Ser. No. 15/062,669 filed 7 Mar. 2016, which is: a) a continuation-in-part of application Ser. No. 14/698,578 filed 28 Apr. 2015 and b) also claims the benefit under 35 USC § 119 of the filing date of International Application PCT/US15/38248 filed 29 Jun. 2015. The entire disclosures of these prior applications are incorporated herein by this reference.

BACKGROUND

This disclosure relates generally to equipment utilized and operations performed in conjunction with a subterranean well and, in one example described below, more particularly provides for flow control in wells.

It can be beneficial to be able to control how and where fluid flows in a well. For example, it may be desirable in some circumstances to be able to prevent fluid from flowing into a particular formation zone. As another example, it may be desirable in some circumstances to cause fluid to flow into a particular formation zone, instead of into another formation zone. Therefore, it will be readily appreciated that improvements are continually needed in the art of controlling fluid flow in wells.

BRIEF DESCRIPTION OF THE DRAWINGS

FIGS. 6A & B are representative partially cross-sectional views of the flow conveyed device in a well, the device being conveyed by flow in FIG. 6A, and engaging a casing opening in FIG. 6B.

DETAILED DESCRIPTION

Figure 1:
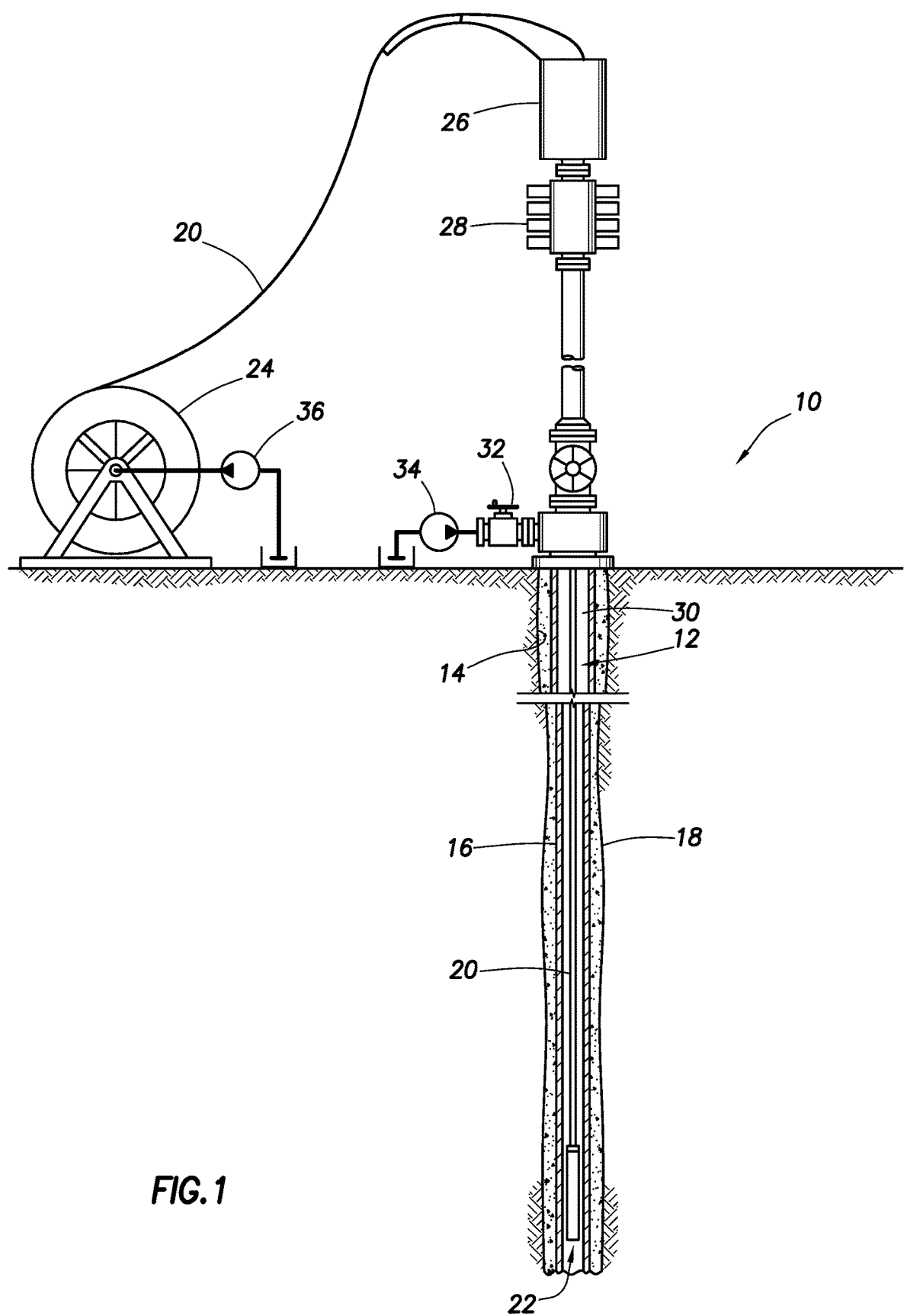
FIG. 1 is a representative partially cross-sectional view of an example of a well system and associated method which can embody principles of this disclosure.

Representatively illustrated in FIG. 1 is a system 10 for use with a well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a tubular string 12 is conveyed into a wellbore 14 lined with casing 16 and cement 18. Although multiple casing strings would typically be used in actual practice, for clarity of illustration only one casing string 16 is depicted in the drawings.

Although the wellbore 14 is illustrated as being vertical, sections of the wellbore could instead be horizontal or otherwise inclined relative to vertical. Although the wellbore 14 is completely cased and cemented as depicted in FIG. 1, any sections of the wellbore in which operations described in more detail below are performed could be uncased or open hole. Thus, the scope of this disclosure is not limited to any particular details of the system 10 and method.

The tubular string 12 of FIG. 1 comprises coiled tubing 20 and a bottom hole assembly 22. As used herein, the term "coiled tubing" refers to a substantially continuous tubing that is stored on a spool or reel 24. The reel 24 could be mounted, for example, on a skid, a trailer, a floating vessel, a vehicle, etc., for transport to a wellsite. Although not shown in FIG. 1, a control room or cab would typically be provided with instrumentation, computers, controllers, recorders, etc., for controlling equipment such as an injector 26 and a blowout preventer stack 28.

As used herein, the term "bottom hole assembly" refers to an assembly connected at a distal end of a tubular string in a well. It is not necessary for a bottom hole assembly to be positioned or used at a "bottom" of a hole or well.

When the tubular string 12 is positioned in the wellbore 14, an annulus 30 is formed radially between them. Fluid, slurries, etc., can be flowed from surface into the annulus 30 via, for example, a casing valve 32. One or more pumps 34 may be used for this purpose. Fluid can also be flowed to surface from the wellbore 14 via the annulus 30 and valve 32.

Fluid, slurries, etc., can also be flowed from surface into the wellbore 14 via the tubing 20, for example, using one or more pumps 36. Fluid can also be flowed to surface from the wellbore 14 via the tubing 20.

In the further description below of the examples of FIGS. 2A-9, one or more flow conveyed devices are used to block or plug openings in the system 10 of FIG. 1. However, it should be clearly understood that these methods and the flow conveyed device may be used with other systems, and the flow conveyed device may be used in other methods in keeping with the principles of this disclosure.

The example methods described below allow existing fluid passageways to be blocked permanently or temporarily in a variety of different applications. Certain flow conveyed device examples described below are made of a fibrous material and comprise a "knot" or other enlarged geometry.

The devices are conveyed into leak paths using pumped fluid. The fibrous material "finds" and follows the fluid flow, pulling the enlarged geometry into a restricted portion of a flow path, causing the enlarged geometry and additional strands to become tightly wedged into the flow path thereby sealing off fluid communication.

The devices can be made of degradable or non-degradable materials. The degradable materials can be either self-degrading, or can require degrading treatments, such as, by exposing the materials to certain acids, certain base compositions, certain chemicals, certain types of radiation (e.g., electromagnetic or "nuclear"), or elevated temperature. The exposure can be performed at a desired time using a form of well intervention, such as, by spotting or circulating a fluid in the well so that the material is exposed to the fluid.

In some examples, the material can be an acid degradable material (e.g., nylon, etc.), a mix of acid degradable material (for example, nylon fibers mixed with particulate such as calcium carbonate), self-degrading material (e.g., poly-lactic acid (PLA), poly-glycolic acid (PGA), etc.), material that degrades by galvanic action (such as, magnesium alloys, aluminum alloys, etc.), a combination of different self-degrading materials, or a combination of self-degrading and non-self-degrading materials.

Multiple materials can be pumped together or separately. For example, nylon and calcium carbonate could be pumped as a mixture, or the nylon could be pumped first to initiate a seal, followed by calcium carbonate to enhance the seal.

In certain examples described below, the device can be made of knotted fibrous materials. Multiple knots can be used with any number of loose ends. The ends can be frayed or un-frayed. The fibrous material can be rope, fabric, cloth or another woven or braided structure.

The device can be used to block open sleeve valves, perforations or any leak paths in a well (such as, leaking connections in casing, corrosion holes, etc.). Any opening through which fluid flows can be blocked with a suitably configured device.

In one example method described below, a well with an existing perforated zone can be re-completed. Devices (either degradable or non-degradable) are conveyed by flow to plug all existing perforations.

The well can then be re-completed using any desired completion technique. If the devices are degradable, a degrading treatment can then be placed in the well to open up the plugged perforations (if desired).

In another example method described below, multiple formation zones can be perforated and fractured in a single trip of the bottom hole assembly 22 into the well. In the method, one zone is perforated, the zone is fractured, and then the perforated zone is plugged using one or more devices.

These steps are repeated for each additional zone, except that a last zone is not plugged. All of the plugged zones are eventually unplugged by waiting a certain period of time (if the devices are self-degrading), or by applying an appropriate degrading treatment.

Referring specifically now to FIGS. 2A-D, steps in an example of a method in which the bottom hole assembly 22 of FIG. 1 can be used in re-completing a well are representatively illustrated. In this method (see FIG. 2A), the well has existing perforations 38 that provide for fluid communication between an earth formation zone 40 and an interior of the casing 16. However, it is desired to re-complete the zone 40, in order to enhance the fluid communication.

Figure 2A:
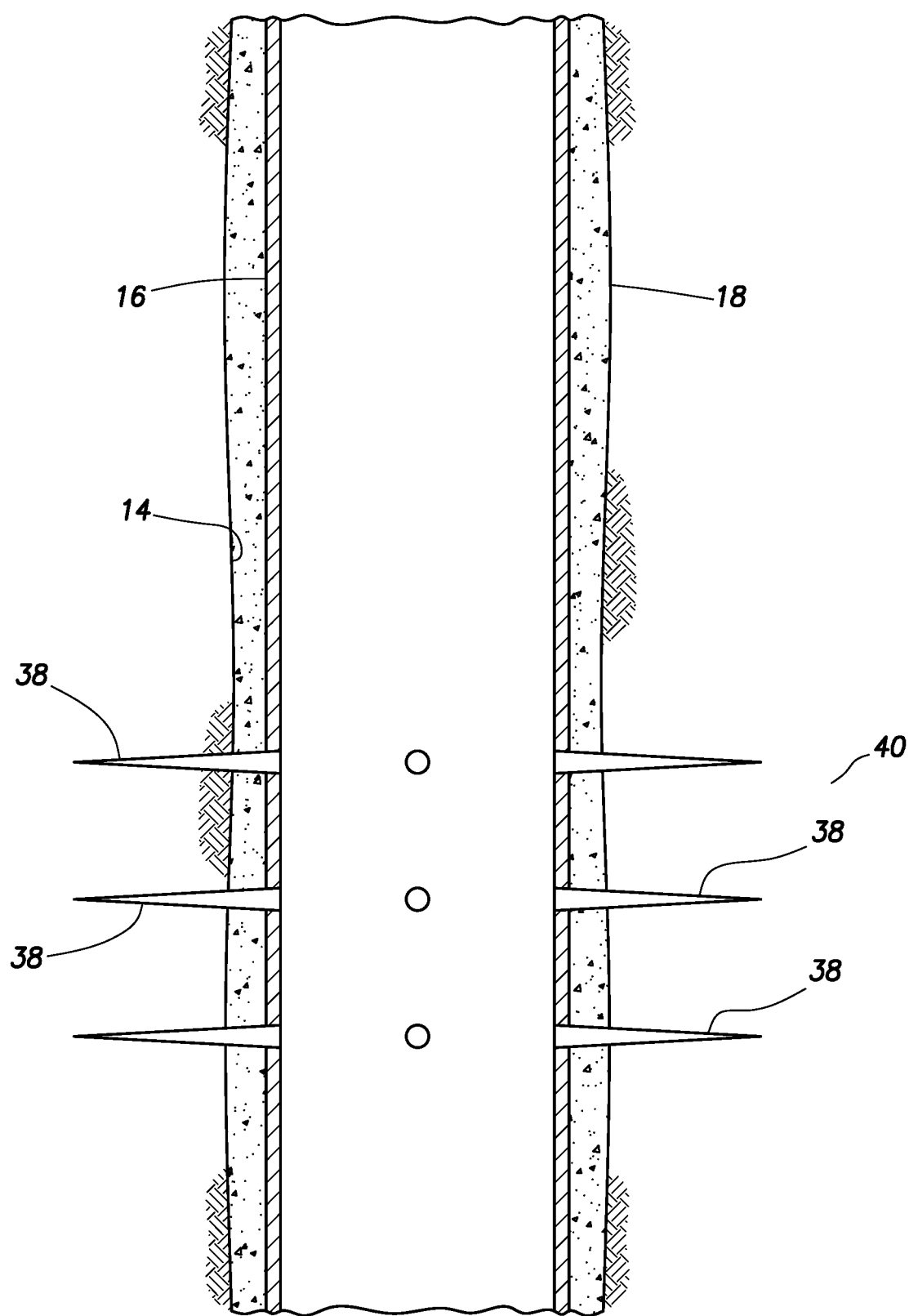
FIGS. 2A-D are enlarged scale representative partially cross-sectional views of steps in an example of a re-completion method that may be practiced with the system of FIG. 1.
Figure 2B:
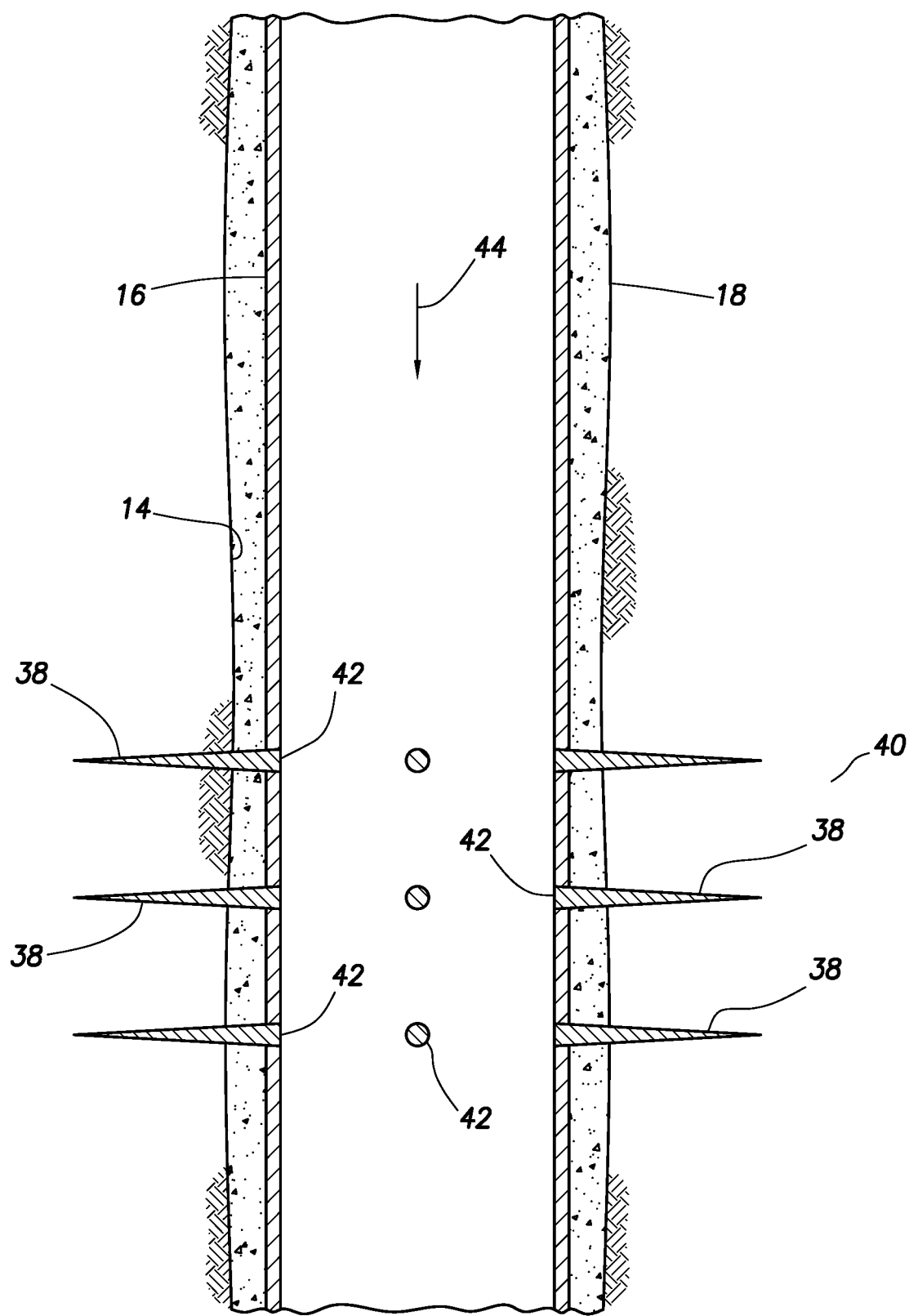

Referring additionally now to FIG. 2B, the perforations 38 are plugged, thereby preventing flow through the perforations into the zone 40. Plugs 42 in the perforations can be flow conveyed devices, as described more fully below. In that case, the plugs 42 can be conveyed through the casing 16 and into engagement with the perforations 38 by fluid flow 44.

Figure 2C:
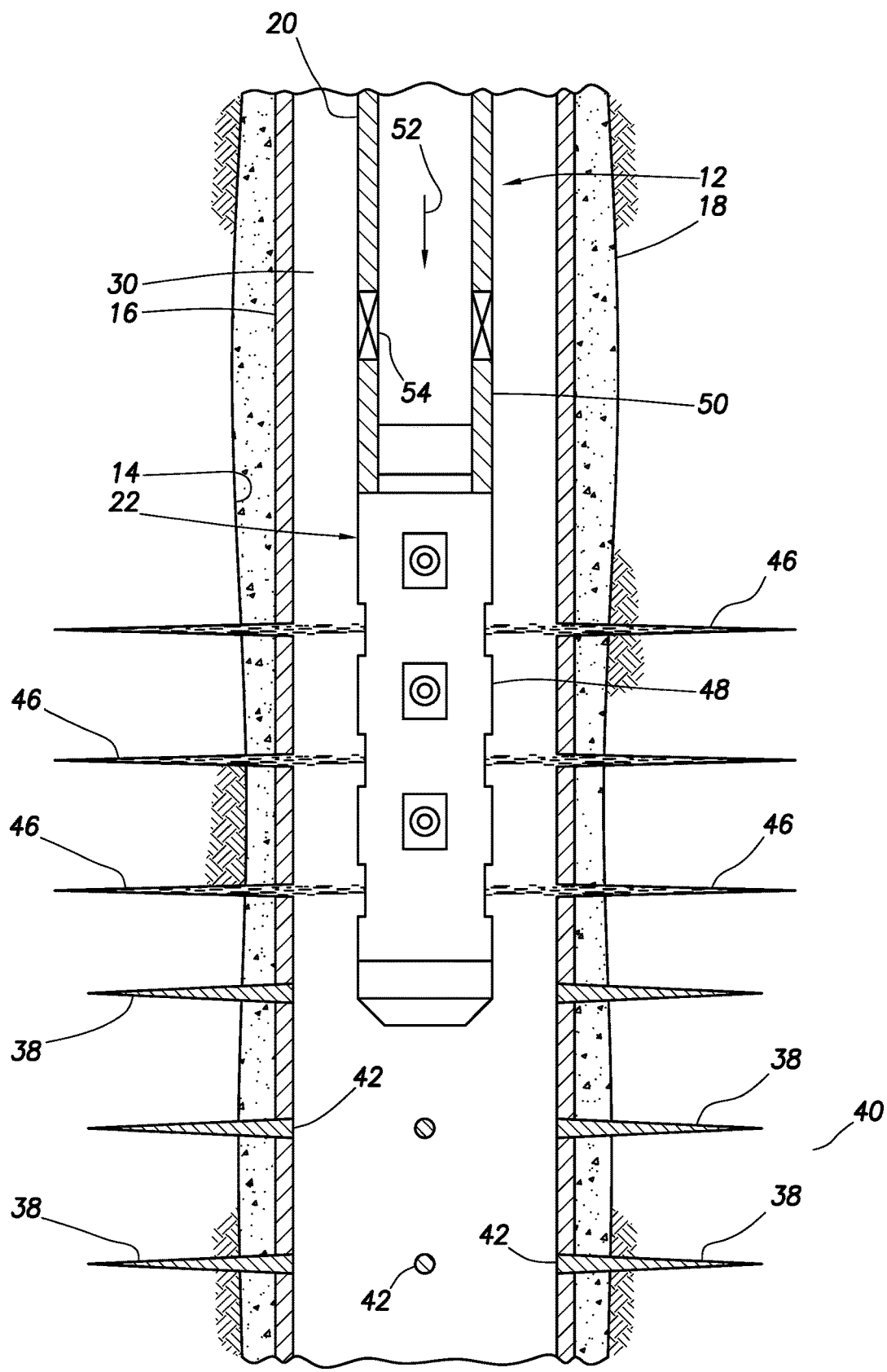

Referring additionally now to FIG. 2C, new perforations 46 are formed through the casing 16 and cement 18 by use of an abrasive jet perforator 48. In this example, the bottom hole assembly 22 includes the perforator 48 and a circulating valve assembly 50. Although the new perforations 46 are depicted as being formed above the existing perforations 38, the new perforations could be formed in any location in keeping with the principles of this disclosure.

Note that other means of providing perforations 46 may be used in other examples. Explosive perforators, drills, etc., may be used if desired. The scope of this disclosure is not limited to any particular perforating means, or to use with perforating at all.

The circulating valve assembly 50 controls flow between the coiled tubing 20 and the perforator 48, and controls flow between the annulus 30 and an interior of the tubular string 12. Instead of conveying the plugs 42 into the well via flow 44 through the interior of the casing 16 (see FIG. 2B), in other examples the plugs could be deployed into the tubular string 12 and conveyed by fluid flow 52 through the tubular string prior to the perforating operation. In that case, a valve 54 of the circulating valve assembly 50 could be opened to allow the plugs 42 to exit the tubular string 12 and flow into the interior of the casing 16 external to the tubular string.

Figure 2D:
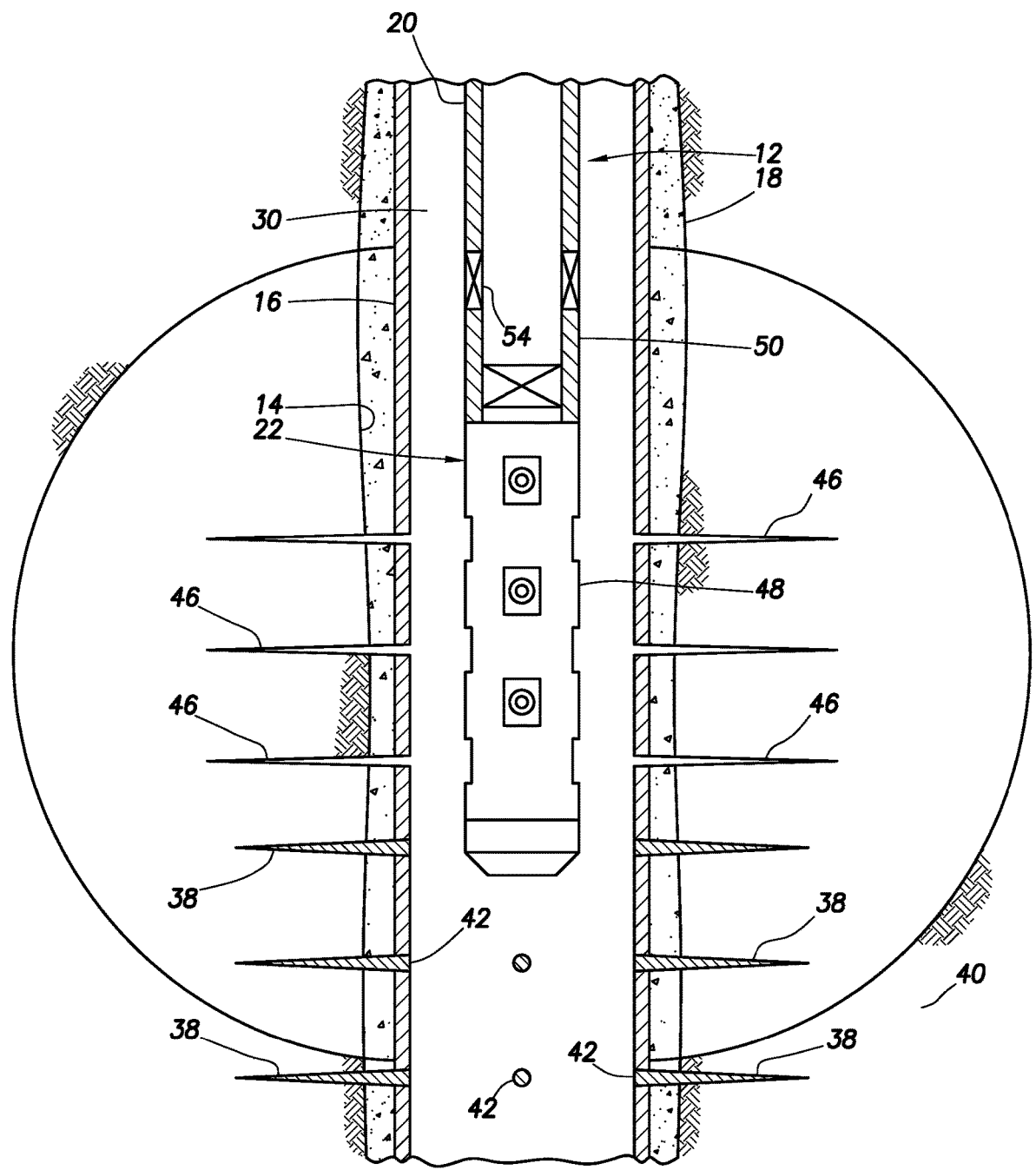

Referring additionally now to FIG. 2D, the zone 40 has been fractured by applying increased pressure to the zone after the perforating operation. Enhanced fluid communication is now permitted between the zone 40 and the interior of the casing 16. Note that fracturing is not necessary in keeping with the principles of this disclosure.

In the FIG. 2D example, the plugs 42 prevent the pressure applied to fracture the zone 40 via the perforations 46 from leaking into the zone via the perforations 38. The plugs 42 may remain in the perforations 38 and continue to prevent flow through the perforations, or the plugs may degrade, if desired, so that flow is eventually permitted through the perforations.

Referring additionally now to FIGS. 3A-D, steps in another example of a method in which the bottom hole assembly 22 of FIG. 1 can be used in completing multiple zones 40a-c of a well are representatively illustrated. The multiple zones 40a-c are each perforated and fractured during a single trip of the tubular string 12 into the well.

Figure 3A:
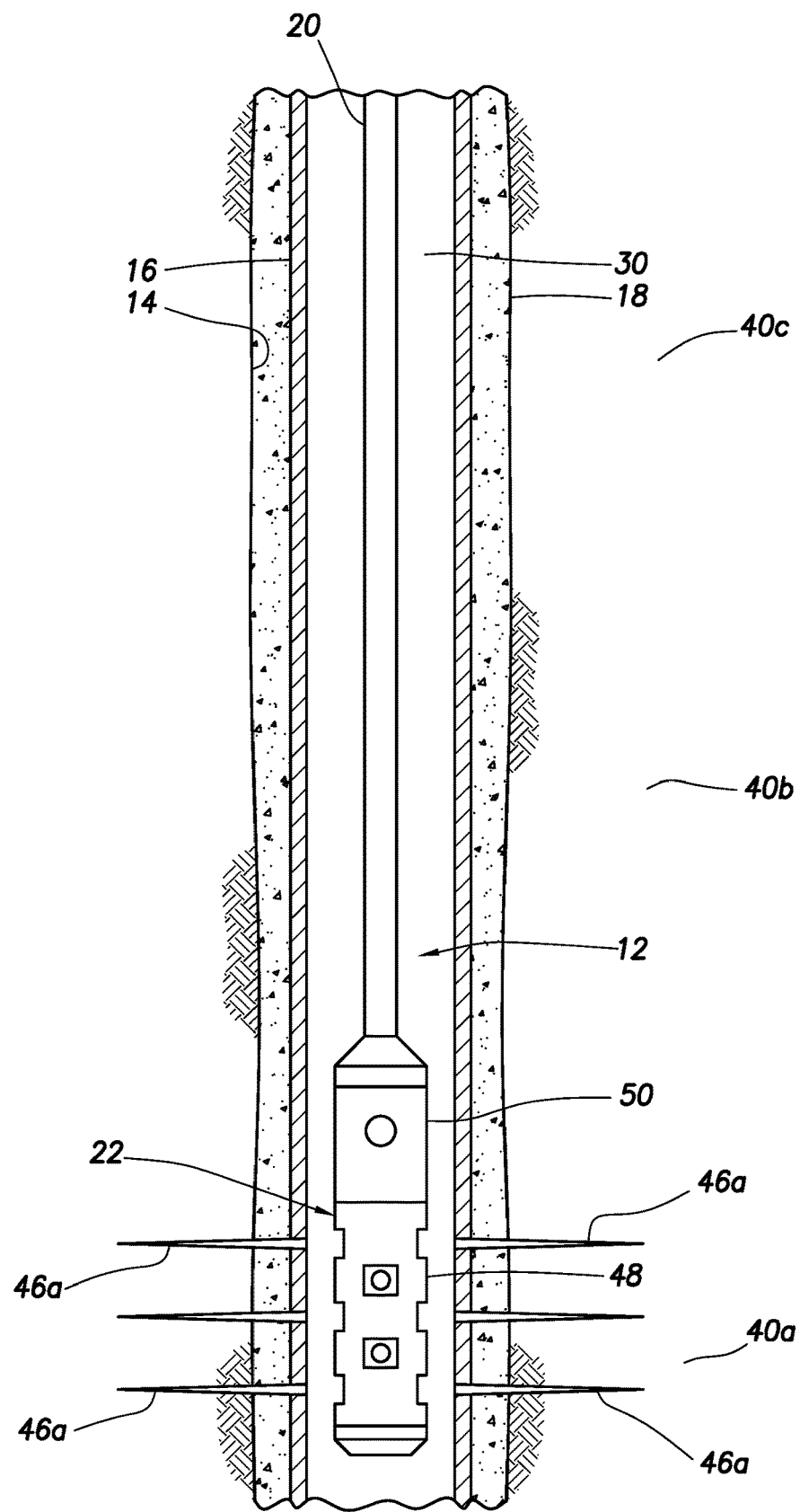
FIGS. 3A-D are representative partially cross-sectional views of steps in another example of a method that may be practiced with the system of FIG. 1.

In FIG. 3A, the tubular string 12 has been deployed into the casing 16, and has been positioned so that the perforator 48 is at the first zone 40a to be completed. The perforator 48 is then used to form perforations 46a through the casing 16 and cement 18, and into the zone 40a.

Figure 3B:
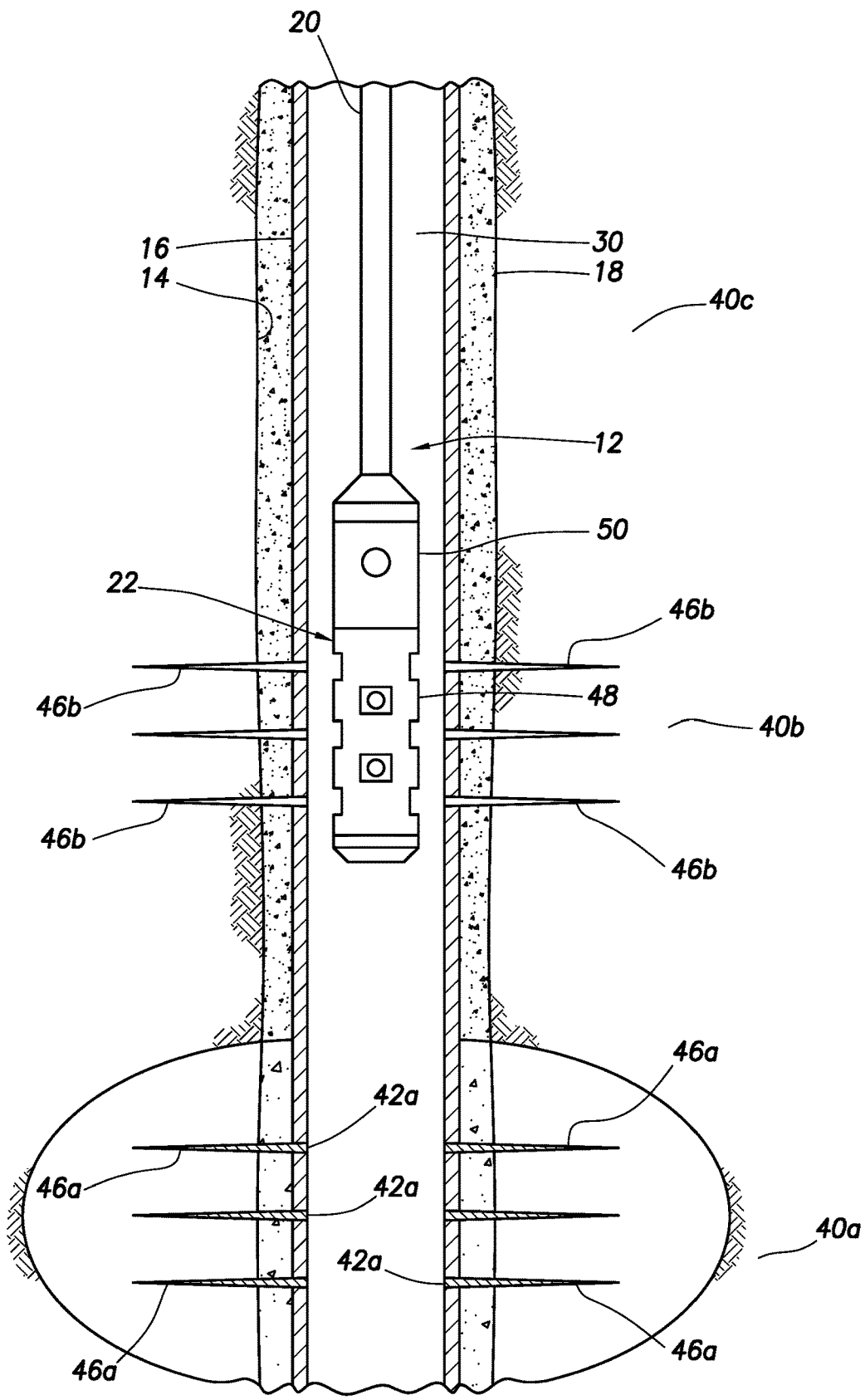

In FIG. 3B, the zone 40a has been fractured by applying increased pressure to the zone via the perforations 46a. The fracturing pressure may be applied, for example, via the annulus 30 from the surface (e.g., using the pump 34 of FIG. 1), or via the tubular string 12 (e.g., using the pump 36 of FIG. 1). The scope of this disclosure is not limited to any particular fracturing means or technique, or to the use of fracturing at all.

After fracturing of the zone 40a, the perforations 46a are plugged by deploying plugs 42a into the well and conveying them by fluid flow into sealing engagement with the perforations. The plugs 42a may be conveyed by flow 44 through the casing 16 (e.g., as in FIG. 2B), or by flow 52 through the tubular string 12 (e.g., as in FIG. 2C).

The tubular string 12 is repositioned in the casing 16, so that the perforator 48 is now located at the next zone 40b to be completed. The perforator 48 is then used to form perforations 46b through the casing 16 and cement 18, and into the zone 40b. The tubular string 12 may be repositioned before or after the plugs 42a are deployed into the well.

Figure 3C:
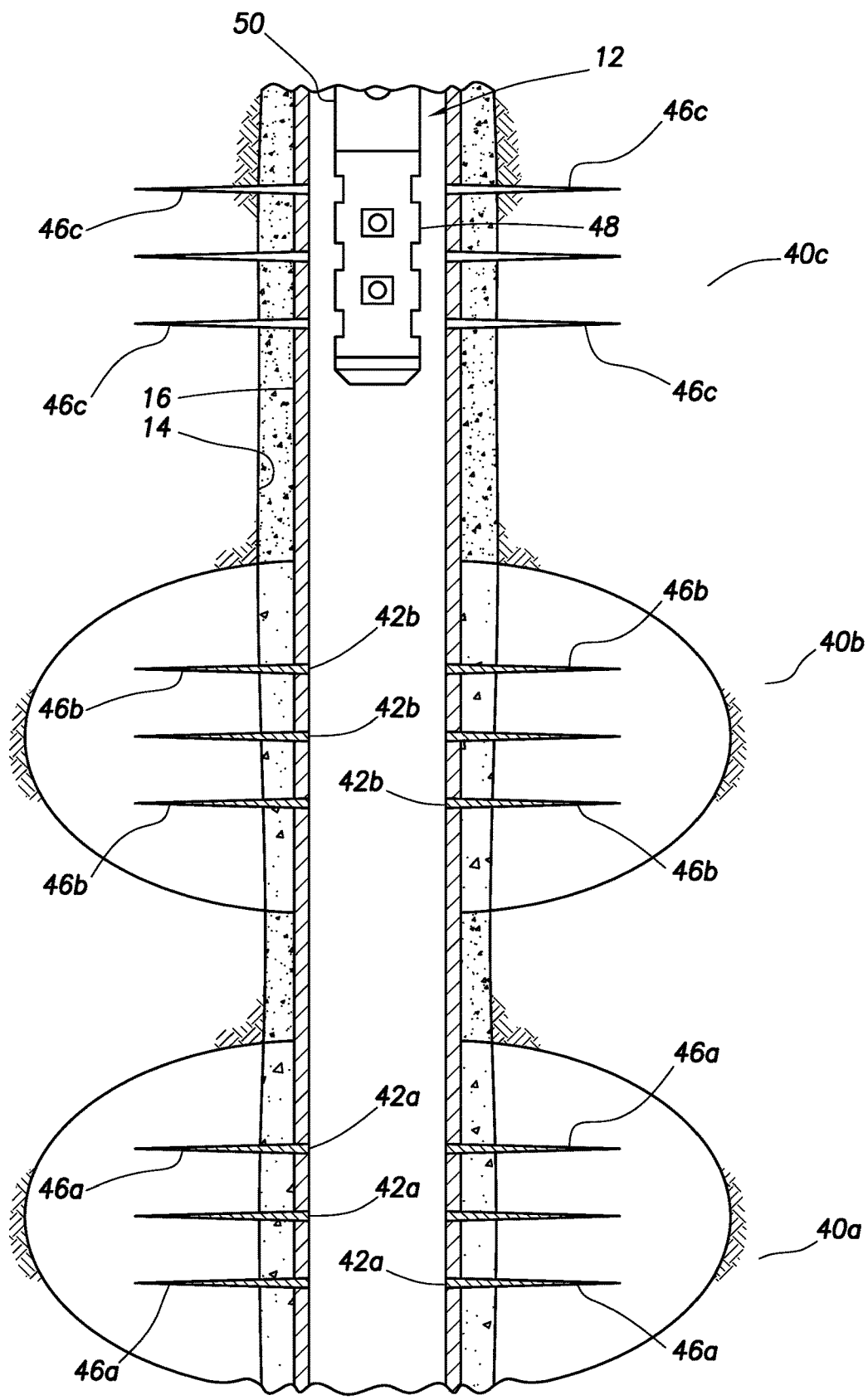

In FIG. 3C, the zone 40b has been fractured by applying increased pressure to the zone via the perforations 46b. The fracturing pressure may be applied, for example, via the annulus 30 from the surface (e.g., using the pump 34 of FIG. 1), or via the tubular string 12 (e.g., using the pump 36 of FIG. 1).

After fracturing of the zone 40b, the perforations 46b are plugged by deploying plugs 42b into the well and conveying them by fluid flow into sealing engagement with the perforations. The plugs 42*b* may be conveyed by flow 44 through the casing 16, or by flow 52 through the tubular string 12.

The tubular string 12 is repositioned in the casing 16, so that the perforator 48 is now located at the next zone 40*c* to be completed. The perforator 48 is then used to form perforations 46*c* through the casing 16 and cement 18, and into the zone 40*c*. The tubular string 12 may be repositioned before or after the plugs 42*b* are deployed into the well.

Figure 3D:
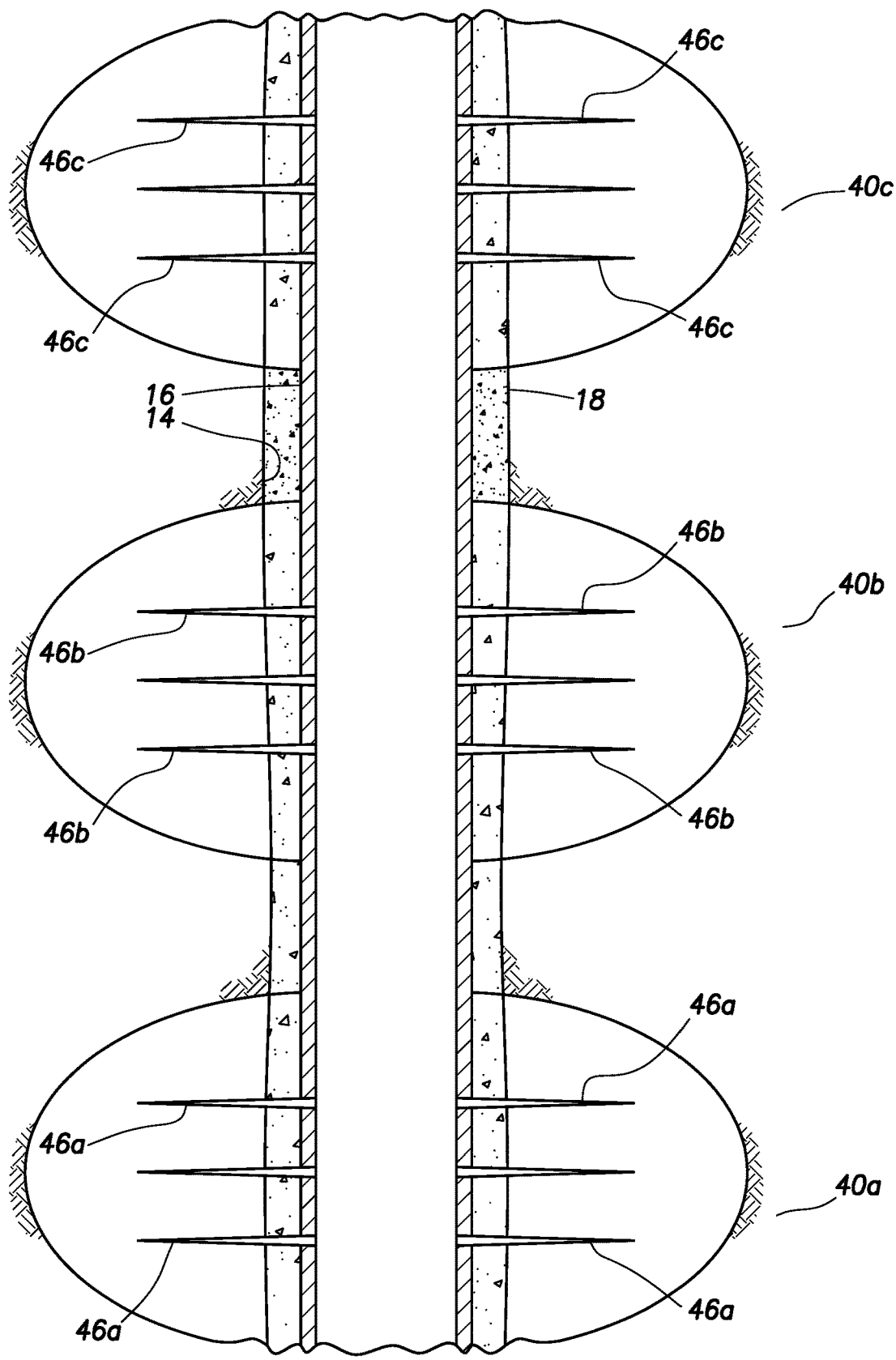

In FIG. 3D, the zone 40*c* has been fractured by applying increased pressure to the zone via the perforations 46*c*. The fracturing pressure may be applied, for example, via the annulus 30 from the surface (e.g., using the pump 34 of FIG. 1), or via the tubular string 12 (e.g., using the pump 36 of FIG. 1).

The plugs 42*a,b* are degraded and no longer prevent flow through the perforations 46*a,b*. Thus, as depicted in FIG. 3D, flow is permitted between the interior of the casing 16 and each of the zones 40*a-c*.

The plugs 42*a,b* may be degraded in any manner. The plugs 42*a,b* may degrade in response to application of a degrading treatment, in response to passage of a certain period of time, or in response to exposure to elevated downhole temperature. The degrading treatment could include exposing the plugs 42*a,b* to a particular type of radiation, such as electromagnetic radiation (e.g., light having a certain wavelength or range of wavelengths, gamma rays, etc.) or "nuclear" particles (e.g., gamma, beta, alpha or neutron).

The plugs 42*a,b* may degrade by galvanic action or by dissolving. The plugs 42*a,b* may degrade in response to exposure to a particular fluid, either naturally occurring in the well (such as water or hydrocarbon fluid), or introduced therein.

Note that any number of zones may be completed in any order in keeping with the principles of this disclosure. The zones 40*a-c* may be sections of a single earth formation, or they may be sections of separate formations.

Figure 4:
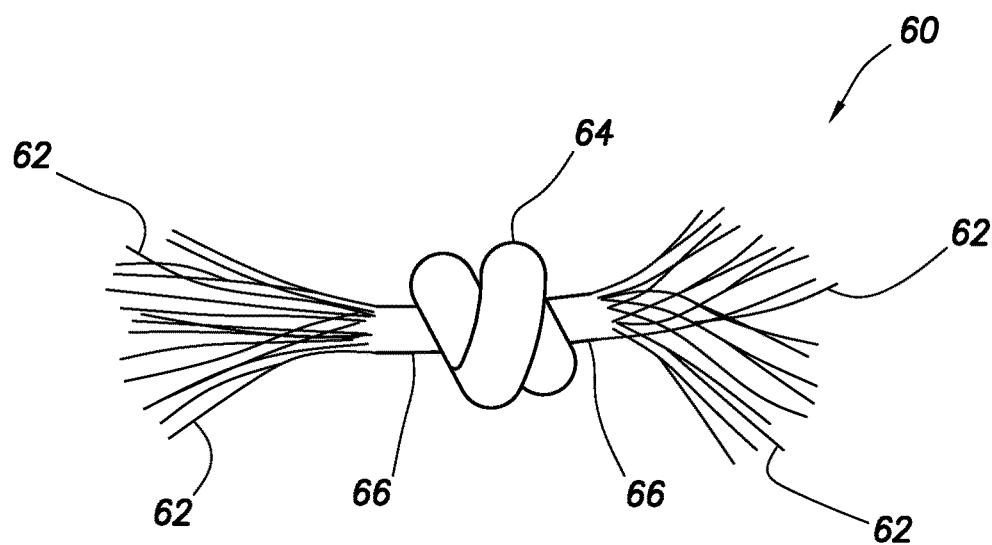
FIG. 4 is an enlarged scale representative elevational view of a flow conveyed device that may be used in the system and methods of FIGS. 1-3D, and which can embody the principles of this disclosure.

Referring additionally now to FIG. 4, an example of a flow conveyed device 60 that can incorporate the principles of this disclosure is representatively illustrated. The device 60 may be used for any of the plugs 42, 42*a,b* described above in the method examples of FIGS. 2A-3D, or the device may be used in other methods.

The device 60 example of FIG. 4 includes multiple fibers 62 extending outwardly from an enlarged body 64. As depicted in FIG. 4, each of the fibers 62 has a lateral dimension (e.g., a thickness or diameter) that is substantially smaller than a size (e.g., a thickness or diameter) of the body 64.

The body 64 can be dimensioned so that it will effectively engage and seal off a particular opening in a well. For example, if it is desired for the device 60 to seal off a perforation in a well, the body 64 can be formed so that it is somewhat larger than a diameter of the perforation. If it is desired for multiple devices 60 to seal off multiple openings having a variety of dimensions (such as holes caused by corrosion of the casing 16), then the bodies 64 of the devices can be formed with a corresponding variety of sizes.

In the FIG. 4 example, the fibers 62 are joined together (e.g., by braiding, weaving, cabling, etc.) to form lines 66 that extend outwardly from the body 64. In this example, there are two such lines 66, but any number of lines (including one) may be used in other examples.

The lines 66 may be in the form of one or more ropes, in which case the fibers 62 could comprise frayed ends of the rope(s). In addition, the body 64 could be formed by one or more knots in the rope(s). In some examples, the body 64 can comprise a fabric or cloth, the body could be formed by one or more knots in the fabric or cloth, and the fibers 62 could extend from the fabric or cloth.

In the FIG. 4 example, the body 64 is formed by a double overhand knot in a rope, and ends of the rope are frayed, so that the fibers 62 are splayed outward. In this manner, the fibers 62 will cause significant fluid drag when the device 60 is deployed into a flow stream, so that the device will be effectively "carried" by, and "follow," the flow.

However, it should be clearly understood that other types of bodies and other types of fibers may be used in other examples. The body 64 could have other shapes, the body could be hollow or solid, and the body could be made up of one or multiple materials. The fibers 62 are not necessarily joined by lines 66, and the fibers are not necessarily formed by fraying ends of ropes or other lines. Thus, the scope of this disclosure is not limited to the construction, configuration or other details of the device 60 as described herein or depicted in the drawings.

Figure 5:
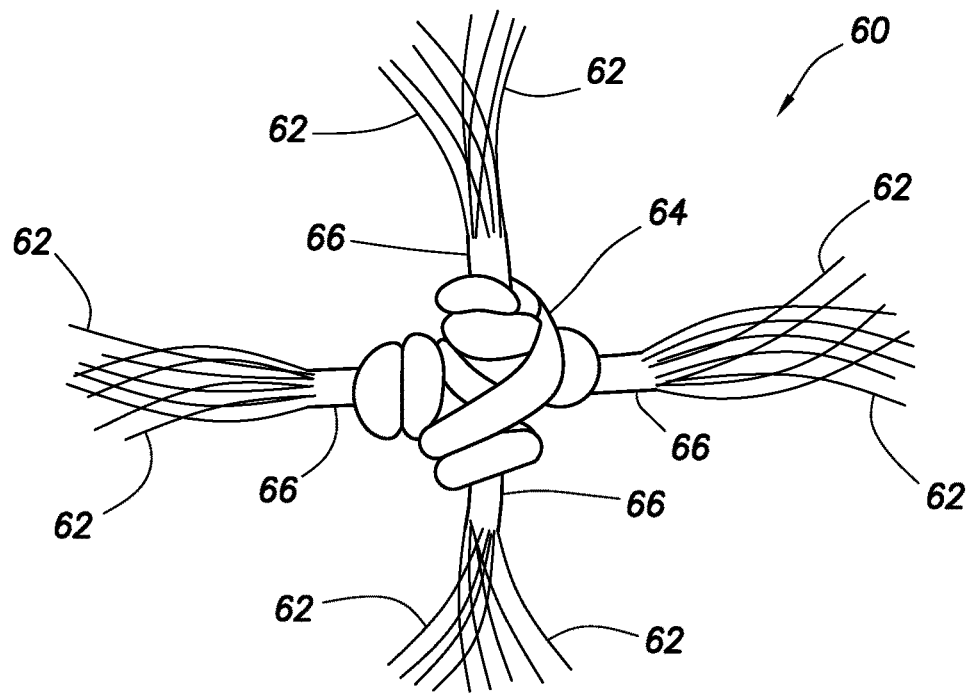
FIG. 5 is a representative elevational view of another example of the flow conveyed device.

Referring additionally now to FIG. 5, another example of the device 60 is representatively illustrated. In this example, four sets of the fibers 62 are joined by a corresponding number of lines 66 to the body 64. The body 64 is formed by one or more knots in the lines 66.

FIG. 5 demonstrates that a variety of different configurations are possible for the device 60. Accordingly, the principles of this disclosure can be incorporated into other configurations not specifically described herein or depicted in the drawings. Such other configurations may include fibers joined to bodies without use of lines, bodies formed by techniques other than knotting, etc.

Referring additionally now to FIGS. 6A & B, an example of a use of the device 60 of FIG. 4 to seal off an opening 68 in a well is representatively illustrated. In this example, the opening 68 is a perforation formed through a sidewall 70 of a tubular string 72 (such as, a casing, liner, tubing, etc.). However, in other examples the opening 68 could be another type of opening, and may be formed in another type of structure.

The device 60 is deployed into the tubular string 72 and is conveyed through the tubular string by fluid flow 74. The fibers 62 of the device 60 enhance fluid drag on the device, so that the device is influenced to displace with the flow 74.

Since the flow 74 (or a portion thereof) exits the tubular string 72 via the opening 68, the device 60 will be influenced by the fluid drag to also exit the tubular string via the opening 68. As depicted in FIG. 6B, one set of the fibers 62 first enters the opening 68, and the body 64 follows. However, the body 64 is appropriately dimensioned, so that it does not pass through the opening 68, but instead is lodged or wedged into the opening. In some examples, the body 64 may be received only partially in the opening 68, and in other examples the body may be entirely received in the opening.

The body 64 may completely or only partially block the flow 74 through the opening 68. If the body 64 only partially blocks the flow 74, any remaining fibers 62 exposed to the flow in the tubular string 72 can be carried by that flow into any gaps between the body and the opening 68, so that a combination of the body and the fibers completely blocks flow through the opening.

In another example, the device 60 may partially block flow through the opening 68, and another material (such as, calcium carbonate, PLA or PGA particles) may be deployed and conveyed by the flow 74 into any gaps between the device and the opening, so that a combination of the device and the material completely blocks flow through the opening.

The device 60 may permanently prevent flow through the opening 68, or the device may degrade to eventually permit flow through the opening. If the device 60 degrades, it may be self-degrading, or it may be degraded in response to any of a variety of different stimuli. Any technique or means for degrading the device 60 (and any other material used in conjunction with the device to block flow through the opening 68) may be used in keeping with the scope of this disclosure.

Figure 7:
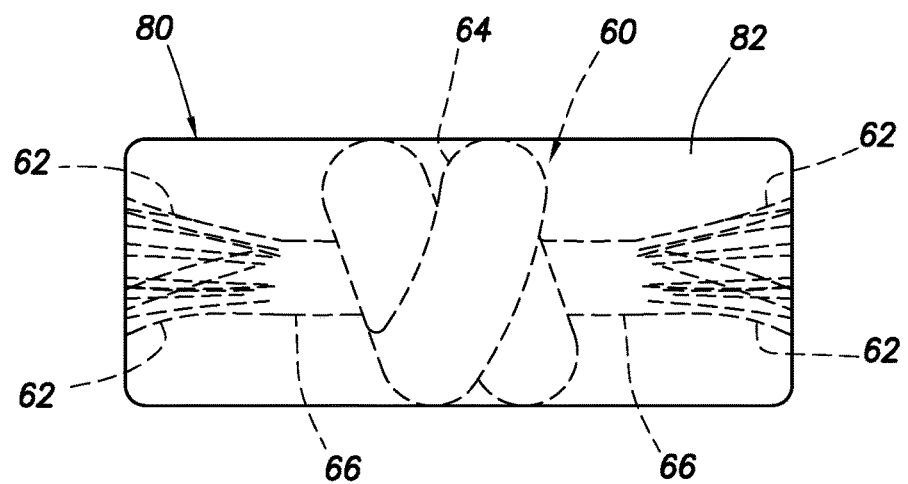
FIGS. 7-9 are representative elevational views of examples of the flow conveyed device with a retainer.
Figure 8:
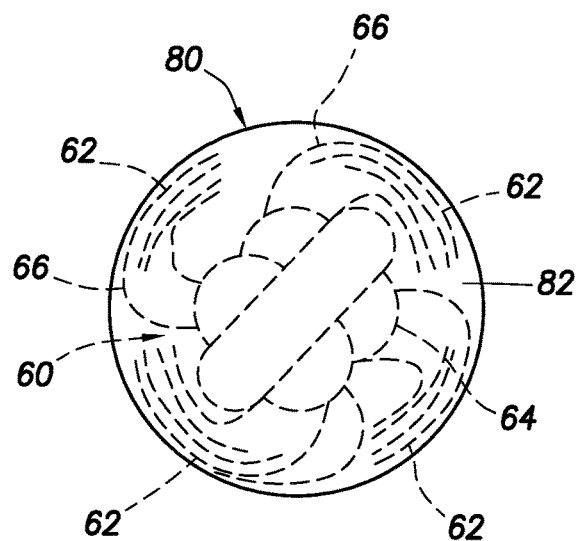
Figure 9:
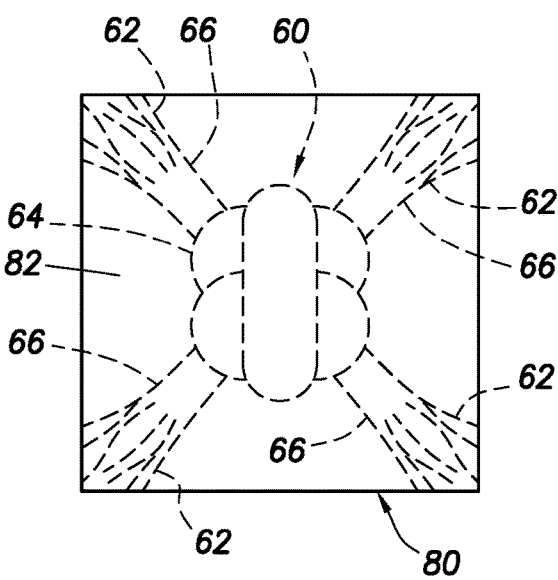

Referring additionally now to FIGS. 7-9, additional examples of the device 60 are representatively illustrated. In these examples, the device 60 is surrounded by, encapsulated in, molded in, or otherwise retained by, a retainer 80.

The retainer 80 aids in deployment of the device 60, particularly in situations where multiple devices are to be deployed simultaneously. In such situations, the retainer 80 for each device 60 prevents the fibers 62 and/or lines 66 from becoming entangled with the fibers and/or lines of other devices.

The retainer 80 could in some examples completely enclose the device 60. In other examples, the retainer 80 could be in the form of a binder that holds the fibers 62 and/or lines 66 together, so that they do not become entangled with those of other devices.

In some examples, the retainer 80 could have a cavity therein, with the device 60 (or only the fibers 62 and/or lines 66) being contained in the cavity. In other examples, the retainer 80 could be molded about the device 60 (or only the fibers 62 and/or lines 66).

After deployment of the device 60 into the well, the retainer 80 dissolves, disperses or otherwise degrades, so that the device is capable of sealing off an opening 68 in the well, as described above. For example, the retainer 80 can be made of a material 82 that degrades in a wellbore environment.

The retainer material 82 may degrade after deployment into the well, but before arrival of the device 60 at the opening 68 to be plugged. In other examples, the retainer material 82 may degrade at or after arrival of the device 60 at the opening 68 to be plugged. If the device 60 also comprises a degradable material, then preferably the retainer material 82 degrades prior to the device material.

The material 82 could, in some examples, melt at elevated wellbore temperatures. The material 82 could be chosen to have a melting point that is between a temperature at the earth's surface and a temperature at the opening 68, so that the material melts during transport from the surface to the downhole location of the opening.

The material 82 could, in some examples, dissolve when exposed to wellbore fluid. The material 82 could be chosen so that the material begins dissolving as soon as it is deployed into the wellbore 14 and contacts a certain fluid (such as, water, brine, hydrocarbon fluid, etc.) therein. In other examples, the fluid that initiates dissolving of the material 82 could have a certain pH range that causes the material to dissolve.

Note that it is not necessary for the material 82 to melt or dissolve in the well. Various other stimuli (such as, passage of time, elevated pressure, flow, turbulence, etc.) could cause the material 82 to disperse, degrade or otherwise cease to retain the device 60. The material 82 could degrade in response to any one, or a combination, of: passage of a predetermined period of time in the well, exposure to a predetermined temperature in the well, exposure to a predetermined fluid in the well, exposure to radiation in the well and exposure to a predetermined chemical composition in the well. Thus, the scope of this disclosure is not limited to any particular stimulus or technique for dispersing or degrading the material 82, or to any particular type of material.

In some examples, the material 82 can remain on the device 60, at least partially, when the device engages the opening 68. For example, the material 82 could continue to cover the body 64 (at least partially) when the body engages and seals off the opening 68. In such examples, the material 82 could advantageously comprise a relatively soft, viscous and/or resilient material, so that sealing between the device 60 and the opening 68 is enhanced.

Suitable relatively low melting point substances that may be used for the material 82 can include wax (e.g., paraffin wax, vegetable wax), ethylene-vinyl acetate copolymer (e.g., ELVAX™ available from DuPont), atactic polypropylene and eutectic alloys. Suitable relatively soft substances that may be used for the material 82 can include a soft silicone composition or a viscous liquid or gel. Suitable dissolvable materials can include PLA, PGA, anhydrous boron compounds (such as anhydrous boric oxide and anhydrous sodium borate), polyvinyl alcohol, polyethylene oxide, salts and carbonates.

In FIG. 7, the retainer 80 is in a cylindrical form. The device 60 is encapsulated in, or molded in, the retainer material 82. The fibers 62 and lines 66 are, thus, prevented from becoming entwined with the fibers and lines of any other devices 60.

In FIG. 8, the retainer 80 is in a spherical form. In addition, the device 60 is compacted, and its compacted shape is retained by the retainer material 82. A shape of the retainer 80 can be chosen as appropriate for a particular device 60 shape, in compacted or un-compacted form.

In FIG. 9, the retainer 80 is in a cubic form. Thus, any type of shape (polyhedron, spherical, cylindrical, etc.) may be used for the retainer 80, in keeping with the principles of this disclosure.

It may now be fully appreciated that the above disclosure provides significant advancements to the art of controlling flow in subterranean wells. In some examples described above, the device 60 may be used to block flow through openings in a well, with the device being uniquely configured so that its conveyance with the flow is enhanced.

The above disclosure provides to the art a method of controlling flow in a subterranean well. In one example, the method can comprise: a device 60 introduced into the well being conveyed by flow 74 in the well, and the device 60 comprising a plurality of fibers 62 extending outwardly from a body 64. A retainer 80 retains the fibers 62.

The retainer 80 may comprise a degradable material 82. The material 82 may degrade between the device 60 being introduced into the well and the device engaging an opening 68 in the well. The material 82 may melt or dissolve in the well.

The method can include the body 64 engaging an opening 68 in the well. The opening 68 may comprise a perforation. In other examples, the opening 68 could be in a valve, at a corrosion location, a point of leakage, etc. The body 64 can prevent flow through the opening 68.

The fibers 62 may be joined together and form one or more lines 66 extending outwardly from the body 64. The lines 66 can comprise one or more ropes. The body 64 can comprise a fabric or cloth.

The body 64 can comprise at least one knot. Other structures (such as, spheres, oblong structures, etc.) may be used in other examples.

The body 64 can comprise a non-degradable or a degradable material. The body 64 may be self-degrading, or the body may degrade in response to application of a degrading treatment. The method can include the material degrading in response to at least one of: passage of a predetermined period of time in the well, exposure to a predetermined temperature in the well, exposure to a predetermined fluid in the well, exposure to radiation (e.g., electromagnetic, light or nuclear, such as gamma, beta, alpha or neutron particles), and exposure to a predetermined chemical composition in the well.

The method can include deploying the device 60 into the well after fracturing a formation zone 40*a,b*. The device 60 may be deployed, and the formation zone 40*a,b* may be fractured, during a single trip of a tubular string 12 into a well.

As used herein, the term "single trip" is used to indicate only a single deployment of a tubular string into a well. The tubular string may be retrieved from the well at a conclusion of the single trip, or the tubular string may not be retrieved from the well.

Also provided to the art by the above disclosure is a system 10 for use with a well. In one example, the system 10 can comprise a flow conveyed device 60 conveyed through a tubular string 72 by flow 74 in the tubular string. The flow conveyed device 60 can comprise a body 64 with a plurality of fibers 62 extending outwardly from the body. A retainer 80 at least partially encloses the flow conveyed device 60.

The retainer 80 may release the fibers 62 in the well. The retainer 80 can comprise a degradable material 82, a material that dissolves in the well, and/or a material that melts in the well.

The flow conveyed device 60 may engage an opening 68 in a sidewall 70 of the tubular string 72. At least a portion of the fibers 62 can be conveyed into the opening 68 by flow 74 through the opening.

The body 64 may extend across and seal off the opening 68. The opening 68 can comprise a perforation. The scope of this disclosure is not limited to any particular type of opening.

A flow conveyed device 60 for use in a subterranean well is also described above. In one example, the device 60 can comprise a degradable body 64, and a plurality of fibers 62 joined to the body. Each of the fibers 62 has a lateral dimension that is substantially smaller than a size of the body 64. The fibers 62 are retained by a retainer 80.

The retainer 80 may degrade in response to passage of a predetermined period of time, in response to exposure to a predetermined fluid, in response to exposure to a predetermined chemical composition, in response to exposure to a predetermined temperature, and/or in response to exposure to radiation (e.g., electromagnetic, light or nuclear, such as gamma, beta, alpha or neutron particles). In some examples, the retainer 80 may not be degradable.

The fibers 62 may comprise a nylon material. The fibers 62 can extend from one or more ropes, fabrics or cloths in some examples.

The body 64 may be degradable by exposure to an acid.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A flow conveyed device for use in a subterranean well, the device comprising:
    a body; and
    a plurality of fibers joined to the body, each of the fibers having a lateral dimension that is substantially smaller than a size of the body,
    wherein the fibers are joined together and form one or more lines extending outwardly from the body,
    wherein the body and the plurality of fibers are degradable in the well, and
    wherein the fibers are retained by a retainer.

2. The device of claim 1, wherein the retainer degrades in response to passage of a predetermined period of time.

3. The device of claim 1, wherein the retainer degrades in response to exposure to a predetermined fluid.

4. The device of claim 1, wherein the retainer degrades in response to exposure to a predetermined chemical composition.

5. The device of claim 1, wherein the retainer degrades in response to exposure to a predetermined temperature.

6. The device of claim 1, wherein the retainer degrades in response to exposure to radiation.

7. The device of claim 1, wherein the lines comprise ropes.

8. The device of claim 1, wherein the fibers comprise a nylon material.

9. The device of claim 1, wherein the body is degradable by exposure to an acid.

* * * * *

UNITED STATES PATENT AND TRADEMARK OFFICE
CERTIFICATE OF CORRECTION

PATENT NO. : 10,641,070 B2
APPLICATION NO. : 15/347535
DATED : May 5, 2020
INVENTOR(S) : Roger L. Schultz et al.

Page 1 of 1

It is certified that error appears in the above-identified patent and that said Letters Patent is hereby corrected as shown below:

On the Title Page

Item [30], insert -- June 29, 2015 (WO) .............. PCT/US15/38248 --

Signed and Sealed this
Fourteenth Day of July, 2020

Andrei Iancu
*Director of the United States Patent and Trademark Office*